United States Patent [19]

von Riesen

[11] Patent Number: 5,027,783
[45] Date of Patent: Jul. 2, 1991

[54] CARBURETOR FOR AN INTERNAL COMBUSTION ENGINE

[76] Inventor: Clark W. von Riesen, 311 Bluff Dr., Melbourne, Fla. 32901

[21] Appl. No.: 599,105

[22] Filed: Oct. 17, 1990

[51] Int. Cl.⁵ .............................................. F02M 33/00
[52] U.S. Cl. ..................................... 123/572; 123/462
[58] Field of Search ........................ 123/572, 573, 462

[56] References Cited

U.S. PATENT DOCUMENTS

| | | | |
|---|---|---|---|
| 3,844,262 | 10/1974 | Dieges | 123/572 |
| 3,923,024 | 12/1975 | Dabrio | 123/572 |
| 4,342,287 | 8/1982 | Concepcion | 123/572 |
| 4,462,372 | 7/1984 | Jackson | 123/462 |
| 4,474,158 | 10/1984 | Mowbray | 123/462 |
| 4,962,745 | 10/1990 | Ohno et al. | 123/572 |

*Primary Examiner*—Andrew M. Dolinar
*Assistant Examiner*—M. Macy

[57] ABSTRACT

Both a system for an method for feeding gasoline fuel into a gasoline internal combustion engine are disclosed herein. This system and method is suitable for use after an internal combustion engine has been started and warmed to normal operating temperature. The system incorporates a two-way valve to stop the flow of fuel to the standard carburetor and direct the flow of fuel to our system and method. Our system incorporates a multi-port valve which selects a predetermined amount of fuel and directs the fuel to the Positive Crankcase Ventilation (P.C.V.) vacuum line which is run thru hot exhaust gases. The fuel by means of P.C.V. vacuum line is fed directly into the intake manifold. The resulting fuel has been vaporized, it is fed into the intake manifold, and mixed with air for combustion. This results in a low pollutant emission and high efficiency. The air for combustion is still controlled by the standard carburetor air intake and control. Each port of the multi-port valve has a selected exhaust port jet to feed a predetermined amount of liquid fuel into the P.C.V. vacuum line which will run the engine at that predetermined power and R.P.M. The present system and method will work with either electric or manual valves. The present system and method is described with a multi-port valve but the scope of present invention will work with a valve which incorporates one or more exhaust port jets.

3 Claims, 1 Drawing Sheet

Clark W. von Riesen
Carburation System and Method for Internal-Combustion Engine

CARBURETOR FOR AN INTERNAL COMBUSTION ENGINE

CROSS REFERENCE TO RELATED APPLICATION

This application is related to compending commonly assigned patent application Ser. No. 06/410,571 filed on Aug. 23, 1982, now abandoned in the name of Clark W. von Riesen, et al. and titled Loren Carburetor.

BACKGROUND OF THE INVENTION

The present invention is directed to the field of internal combustion engines and more particularly to a system for and method of feeding gasoline fuel into an engine of this type. More particularly the present invention is directed to that portion of the above-noted field which is concerned with the delivery and metering of a liquid fuel which has been vaporized prior to mixture with intake airstream. More particularly still, the present invention is directed to that portion of the above-noted-field which is concerned with the maintenance of a quantity of vaporized liquid fuel within the P.C.V. vacuum line to assure an adequate supply of vaporized liquid fuel for an otherwise conventional internal combustion engine.

OBJECTS AND SUMMARY OF THE INVENTION

One object of this system for and method of is to provide an efficient and uncomplicated and economical secondary system for feeding gasoline fuel into a gasoline burning internal combustion engine, after the engine has reached normal operating temperature.

Another object of this system for and method of results in a low pollutant emission and high efficiency operation of an internal combustion engine at a predetermined power and R.P.M.

Still another object of the present invention is to provide a system for feeding gasoline fuel into a gasoline burning internal combustion engine, which system does require the engine's present carburetor to start the engine and bring engine up to the required power and R.P.M. and temperature.

Yet another object of the present invention is to provide a system which can be readily incorporated into an existing engine using its standard carburetor to control air for combustion with its intake and control.

DETAILED DESCRIPTION

Figure 1:
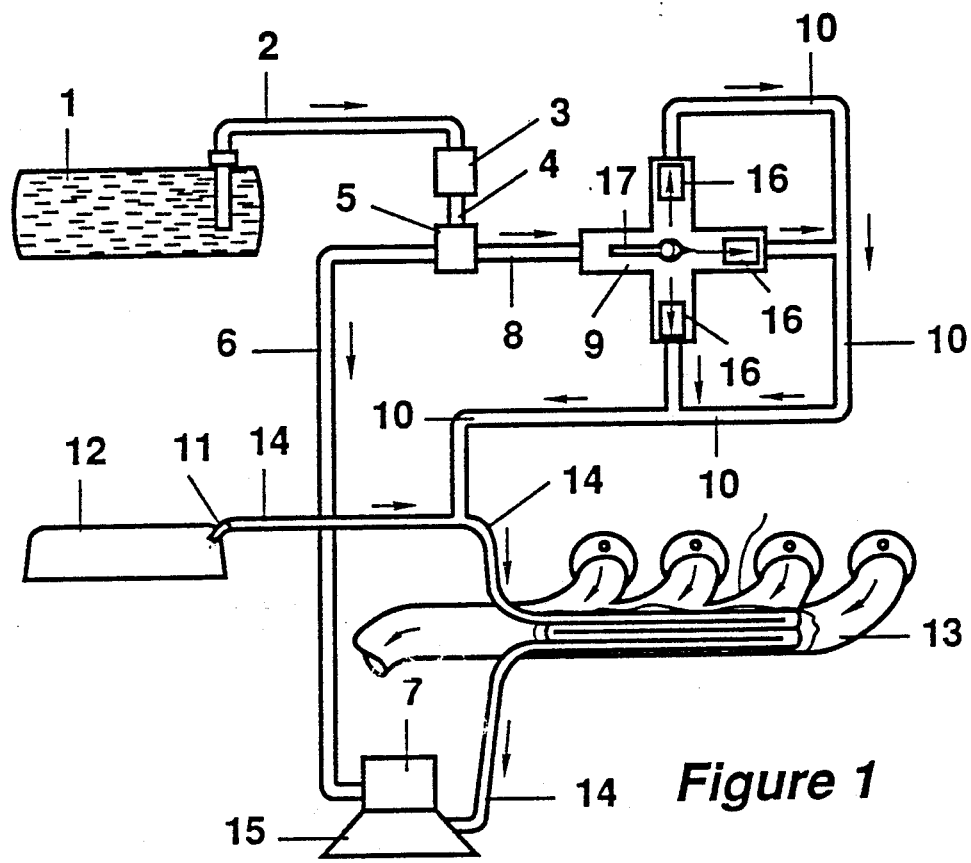
FIG. 1 illustrates the vaporized liquid fuel delivery and mult-port valve system with which the present invention is of utility, with only the directly coacting parts of a conventional four-cylinder engine in the drawings.

Turning now to the drawing, wherein like components are designated by like reference numerals throughout the various figures, attention is first directed to FIG. 1. This figure illustrates a system and method which is designed in accordance with the present invention and which is provided for feeding fuel into a gasoline burning internal combustion engine. The engine itself may be of any conventional type which burns gasoline fuel and would include all of the required components to make it function properly including internal components, an intake manifold, and external but cooperating components such as a carburetor, a fuel pump and cooperating throttle and the like. In fact, as will be discussed hereinafter, in accordance with one embodiment of the present invention, the internal combustion engine is of a conventional type which includes a positive crankcase ventilation system (P.C.V.) system and which, when operating, draws a vacuum through the P.C.V. valve.

As shown in FIG. 1, the system and method includes a fuel tank 1. The fuel is supplied to the fuel pump 3 thru the fuel feed conduit 2. The fuel pump 3 pumps fuel to a two-way valve 5 thru the fuel feed conduit 4. This two-way valve 5 selects either the usual manner the fuel is fed thru fuel feed conduit 6 to the standard carburetor 7 or to the present system and method which is fed thru fuel feed conduit 8 to the multi-port valve 9. This present system and method vaporizes the fuel which is then fed directly to the intake manifold 15 of the engine, bypassing the standard carburetor 7 altogether. In accordance with another aspect of the present invention, the amount of gasoline fuel directed to the engine is varied to provide only the necessary amount to run it at a predetermined power and R.P.M. This is accomplished by selecting the particular exhaust port jet 16 of the multi-port valve 9 which has been sized to run the engine at that particular predetermined power and R.P.M. More specifically, the amount of gasoline fed to the engine is determined by which exhaust port jet 16 of the multi-port valve 9 the fuel is directed thru. Each exhaust port jet 16 determines a selected amount of fuel to run the engine at a predetermined power and R.P.M. The multi-port valve 9 directs fuel to the fuel feed conduit 10 which feeds fuel directly into the engine's P.C.V. line 14. The fuel is fed into the P.C.V. line 14 before the P.C.V. line 14 enters the exhaust manifold 13. The P.C.V. line has a standard P.C.V. valve 11. The P.C.V. valve 11 is attached to a standard engine valve cover 12. The P.C.V. line 14 is then run thru the hot exhaust gas in the exhaust manifold 13, after the fuel feed conduit 10 has directed fuel into the P.C.V. line 14. Then the vaporized feed is fed directly into the intake manifold 15 thru the P.C.V. line 14.

After the engine has reached operating temperature you may employ the present system and method by selecting the two-way valve 5 to send fuel to fuel feed conduit 8. The fuel is then directed thru the multi-port valve 9 into fuel feed conduit 10. Fuel feed conduit 10 feeds the selected amount of fuel, which is part of this present system and method into the P.C.V. line 14 before P.C.V. line 14 enters the exhaust manifold 13, where the present system and method vaporizes the fuel. The heated fuel then continues thru the P.C.V. line 14 out of the exhaust manifold 13. When the heated fuel leaves the exhaust manifold 13 in the P.C.V. line 14, the vaporized fuel then enters directly into the intake manifold 15. The handle 17 selects the exhaust port jet 16 that the fuel is directed thru. The handle 17 also points to the exhaust port jet 16 that the fuel is directed thru.

Figure 2:
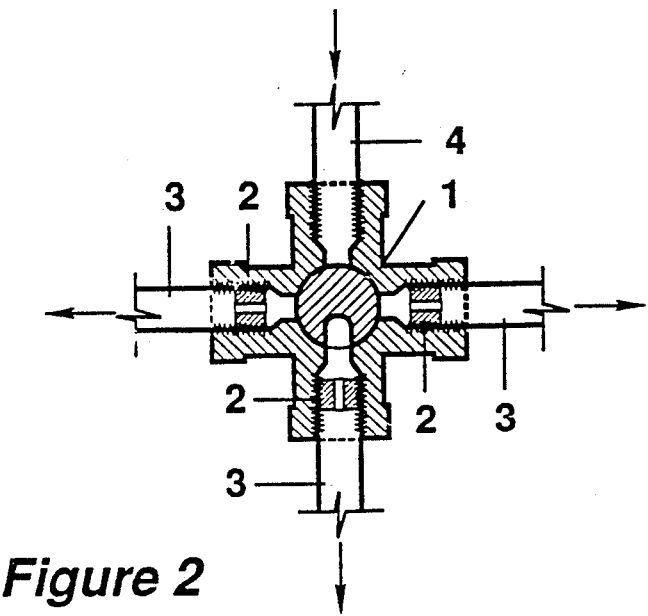
FIG. 2 illustrates the multi-port valve according to the present invention in a partly section, partly diagrammatic view.

As illustrated in FIG. 2 the present system and method employs a multi-port valve 1. The multi-port valve 1 is supplied fuel thru the intake fuel conduit 4. The fuel is then fed thru one of three exhaust port jets 2 of multi-port valve 1. The multi-port valve 1 selects the exhaust port jet 2 by which the present system and method feeds the fuel into the fuel feed conduit 3. The exhaust port jet 2 is of a predetermined size to allow a selected amount of fuel to run the engine at a predetermined power and R.P.M. The exhaust port jet 2 may be changed to allow one of a different size to be installed in any of the three exhaust ports. The multi-port valve 1 will allow the engine to be run at three different predetermined engine powers and R.P.M.'s when all three exhaust port jets 2 are of a different size.

Various changes in the details of the arrangements and the construction of the individual elements may be made without departing from the scope of the present invention, which is not to be deemed as limited otherwise than as indicated by the scope of the appended claims.

I claim:

1. In a system for generating and supplying heated vapors of liquid fuel to an internal combustion engine, after the engine has been started and brought up to normal operating temperature, the engine employing standard intake and exhaust manifolds, a standard carburetor and throttle linkage, and having two fuel paths, one path being a standard fuel system and carburetor, the second path incorporating a multi-port valve which sends a predetermined amount of fuel to the engine, means for selecting the two paths of fuel being a two-way valve which can stop the flow of fuel to the standard fuel system and carburetor and direct the flow of fuel to the multi-port valve which sends a predetermined amount of fuel to run the engine at a predetermined power and R.P.M. using the positive crankcase ventilation system (P.C.V.) to feed the fuel directly into the intake manifold by feeding the fuel into the P.C.V. system vacuum line before the P.C.V. vacuum line is run through hot exhaust gas in the exhaust manifold, the fuel then leaving the exhaust manifold and being fed into the intake manifold by means of the P.C.V. vacuum line; each port of the multi-port valve having a selected exhaust port jet to feed a predetermined amount of liquid fuel into the P.C.V. system which will run the engine at that predetermined power and R.P.M., the power and R.P.M. capable of being changed by switching to one of three different exhaust port jets or by installing still another exhaust port jet in the multi-port valve for still another predetermined power and R.P.M.

2. The multi-port valve according to claim 1 wherein the multi-port valve selects a predetermined amount of fuel for a predetermined power and R.P.M.

3. The exhaust port jet according to claim 1 wherein the exhaust port jet may be changed in each exhaust port of the multi-port valve for a predetermined amount of fuel for a predetermined engine power and R.P.M.

* * * * *